(12) United States Patent
Quinn et al.

(10) Patent No.: US 8,181,188 B2
(45) Date of Patent: May 15, 2012

(54) VERSION RESILIENCY FOR A HOST APPLICATION AND MANAGED CODE

(75) Inventors: Thomas E. Quinn, Seattle, WA (US); Michael Shneerson, Redmond, WA (US); David A. Whitechapel, Seattle, WA (US); William A. Robertson, Redmond, WA (US); Pallavi Vajranabhaiah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1491 days.

(21) Appl. No.: 11/675,616

(22) Filed: Feb. 15, 2007

(65) Prior Publication Data

US 2008/0201700 A1    Aug. 21, 2008

(51) Int. Cl.
G06F 9/44    (2006.01)
(52) U.S. Cl. .......................... 719/328; 717/170
(58) Field of Classification Search .............. 717/170; 719/328
See application file for complete search history.

(56) References Cited

U.S. PATENT DOCUMENTS

| | | | |
|---|---|---|---|
| 5,613,101 A | 3/1997 | Lillich | |
| 6,185,734 B1 | 2/2001 | Saboff et al. | |
| 6,519,767 B1 | 2/2003 | Carter et al. | |
| 6,658,659 B2 | 12/2003 | Hiller et al. | |
| 6,868,425 B1 | 3/2005 | Bergstraesser et al. | |
| 6,928,637 B2 | 8/2005 | Leherbauer | |
| 6,996,817 B2 | 2/2006 | Birum et al. | |
| 7,055,147 B2 | 5/2006 | Iterum et al. | |
| 2002/0078262 A1 | 6/2002 | Harrison et al. | |
| 2003/0187929 A1 | 10/2003 | Pugh et al. | |
| 2003/0191870 A1 | 10/2003 | Duggan | |
| 2005/0055686 A1 | 3/2005 | Buban et al. | |
| 2006/0195820 A1 | 8/2006 | Curtis et al. | |
| 2006/0195836 A1 | 8/2006 | Lu et al. | |
| 2006/0206862 A1* | 9/2006 | Becker et al. | 717/106 |
| 2006/0294494 A1* | 12/2006 | Quinn et al. | 717/104 |

OTHER PUBLICATIONS

U.S. Appl. No. 11/675,614, Shneerson et al.
Conradi, Reidar and Bernhard Westfechtel, "Version Models for Software Configuration Management," ACM Computing Surveys, vol. 30, No. 2, Jun. 1998, ©1998 ACM, pp. 232-282.
Moise, Daniel L. et al., "Integrating a Reverse Engineering Tool with Microsoft Visual Studio .Net," Proceedings of the 8th European Conference on Software Maintenance and Reengineering (CSMR'04), ©2004 IEEE.
Reynolds-Haertle, Robin, "CATfood, a Code Authoring Tool," OOPSLA'02, Nov. 4-8, 2002, Seattle, Washington, ©2002 ACM, pp. 40-41.

(Continued)

*Primary Examiner* — Charles E Anya
(74) *Attorney, Agent, or Firm* — Perkins Coie LLP

(57) ABSTRACT

A method and architecture for increasing version resiliency between a host application that is unmanaged code and managed code is provided. A version resiliency technique specifies that the host application and the managed code communicate via an adapter that implements a protocol to access an object exposed by the host application. The version resiliency technique specifies that when a new version of the host application that impacts an interface exposed by the object of the host application is released, a new version of the adapter that executes within the application domain of the custom code is released. A version of managed code that adheres to the protocol will correctly interact with new versions of the host application that include a new version of the object because a new implementation of the adapter is also provided.

18 Claims, 4 Drawing Sheets

OTHER PUBLICATIONS

Stubbs, Paul, "Let Users Customize Your Apps With Visual Studio Tools for Applications," from the Aug. 2006 issue of msdn magazine, http://msdn.microsoft.com/msdnmag/issues/06/08/AddInPower/default.aspx, [last accessed Dec. 17, 2007].

Zdonik, Stanley B., "Object Management System Concepts," Proceedings of the 2nd ACM-SIGOA Conference on Office Information Systems, ©1984 ACM, pp. 13-19.

* cited by examiner

VERSION RESILIENCY FOR A HOST APPLICATION AND MANAGED CODE

BACKGROUND

Developers of many application programs ("applications") implement the applications so that they can be customized by third parties. To customize an application, a third party develops custom code (e.g., add-ins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "custom code runtimes" that facilitate the development of custom code. A runtime is code that is loaded along with custom code and provides services to the custom code. These services may include higher-level functionality than that exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the NET Framework provided by Microsoft Corporation. The NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

In some environments, both host applications and custom code execute as managed code. A developer of a host application that executes as managed code defines objects (e.g., adhering to the Component Object Model of Microsoft Corporation) that are exposed to the custom code. Because the developer of a host application and the developers of custom code for the host application typically have different product release cycles, the current versions of their products may not be compatible when the custom code is statically bound (e.g., at compile time) to an exposed object. In such a case, when the developer changes the type of an exposed object in a new version of the host application, the current version of the custom code, which was developed based on the old type, may be incompatible with the new type. To address this incompatibility, a Managed Add-in Framework ("MAF") has been developed that allows custom code to dynamically bind (e.g., at runtime) to exposed objects of a host application that executes as managed code. An embodiment of MAF is described in U.S. application Ser. No. 11/167,728, (U.S. Pat. No. 7,523,444) entitled "Managed Automation Programming Model" and filed on Jun. 27, 2005, which is hereby incorporated by reference.

FIG. 1 illustrates aspects of MAF. A host process 100 includes a host application 110 and custom code 120 that both execute as managed code in separate application domains as indicated by application domain boundary 101, which is also a versioning boundary. According to MAF, the host application provides objects 111 and 113 along with adapters 112 and 114. Each adapter is an interface between the object and the custom code and implements an interface protocol that is immutable in the sense that it is guaranteed by the developer of the host application not to change. As such, the developer of the host application is thus free to change the implementation of both an exposed object and its adapter so long as the protocol is not changed. Proxies 121 and 123 may be provided by the developer of the host application to hide some of the complexities of the protocol and cross-application domain communications from the custom code. Because an application domain provides isolation for each application domain, the CLR restricts the types that can be exposed across application domains. For example, the CLR may restrict the types to interfaces and primitive types of data. Nevertheless, MAF allows the versions of the host application and the custom code to be compatible as long as the products adhere to the protocol defined between adapters and proxies.

In other environments, a host application may execute as unmanaged code, and custom code may execute as managed code. In such an environment, a custom code runtime may provide adapters to objects exposed by the host application. These adapters may hide some of the complexity of the exposed objects and may provide higher-level functionality that facilitates the development of custom code. FIG. 2 illustrates an architecture that uses adapters for objects of unmanaged host applications. A host process 200 includes a host application 210, custom code 220, and a custom code runtime 230. The host application executes as unmanaged code, and both the custom code runtime and the custom code execute as managed code in separate application domains as indicated by application domain boundary 201, which is also a versioning boundary. The host application provides objects 211 and 212, and the custom code runtime provides adapters 231 and 232. A difficulty with such an architecture is that a host application and its custom code runtime may be on different release cycles. As such, the current versions of the host application and the custom code runtime may not be compatible when adapters of the custom code runtime are statically bound to objects exposed by the host application. As a result, custom code that uses such a runtime may fail to execute properly when a new version of the host application is released. In addition, new custom code cannot be released to take advantage of the new version of the host application until a new custom code runtime is released.

SUMMARY

A method and architecture for increasing version resiliency among a host application that is unmanaged code and a custom code runtime and custom code that are managed code is provided. A version resiliency technique specifies that the host application and the managed code (i.e., custom code runtime and custom code) communicate via an adapter and a proxy that implement a protocol to access an object exposed by the host application. The version resiliency technique specifies that when a new version of the host application that impacts an interface exposed by the object of the host application is released, a new version of the adapter that executes as managed code within the application domain of the custom code runtime or the custom code is released. The new version of the adapter can then be used by the custom code runtime or the custom code directly to access the exposed object. When the adapter and the proxy execute in the same application domain (e.g., that of the custom code), the adapter is not constrained to exposing only those data types permitted to be exposed via inter-application domain communications. Thus, any version of custom code with a proxy that adheres to the protocol will correctly interact with new versions of the host application that include a new version of the object because a new implementation of the adapter is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
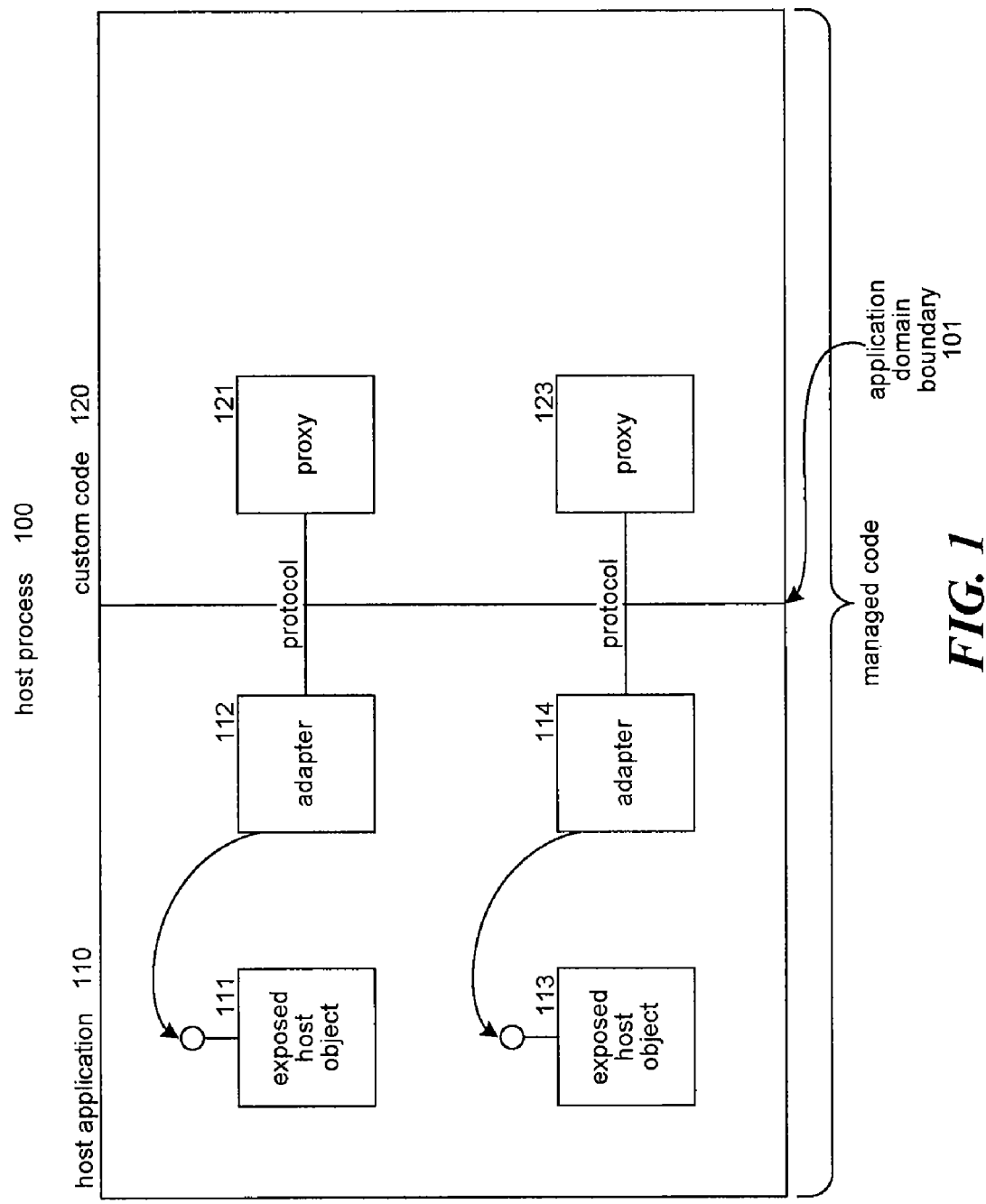
FIG. 1 illustrates aspects of MAF.
Figure 2:
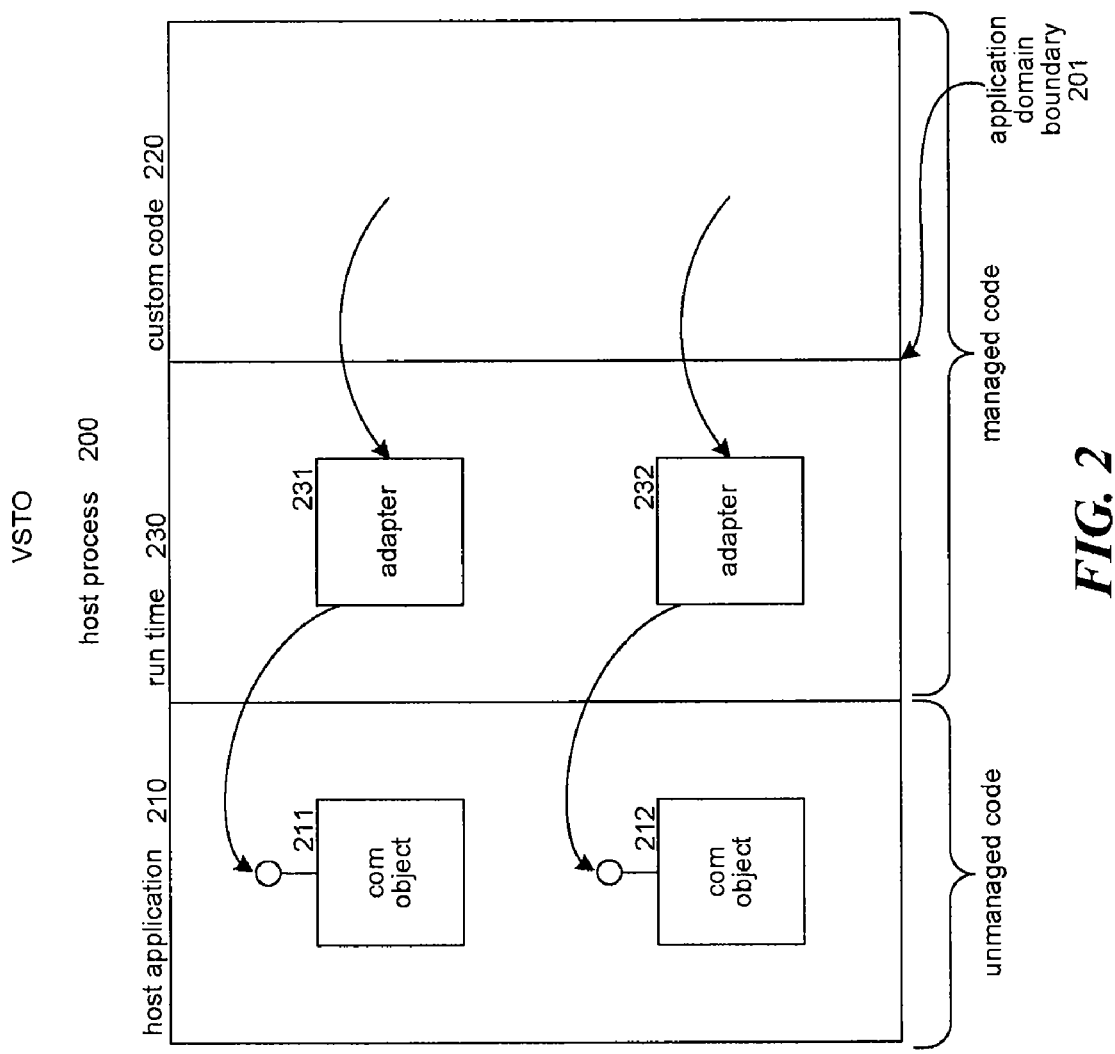
FIG. 2 illustrates an architecture that uses adapters for objects of unmanaged host applications.

A method and architecture for increasing version resiliency between a host application that is unmanaged code and managed code, such as a custom code runtime or custom code, is provided. In one embodiment, a version resiliency technique specifies that the host application and the managed code communicate via an adapter and a proxy that implement a protocol to access an object exposed by the host application. The version resiliency technique specifies that when a new version of the host application that impacts an interface exposed by the object (e.g., that adheres to the Component Object Model) of the host application is released, a new version of the adapter that executes as managed code within the application domain of the custom code runtime or custom code is released. For example, the exposed interface of an object is impacted when a new version of the object provides additional functionality via a new method or a change to the parameters of an existing method. The new version of the adapter factors in the impact on the interface of the exposed object. The protocol implemented by the adapter to communicate with the proxy may or may not change because of the impact on the exposed interface. If the protocol changes, then a new version of the custom code runtime or custom code, including a new version of the proxy, can be developed to take advantage of the changes to the object upon release of a new version of custom code. The new version of the custom code runtime or custom code can then be released. When the adapter executes in the same application domain as the custom code that implements the proxy, the adapter is not constrained to exposing only those data types permitted to be exposed via inter-application domain communications. If a new version of the host application that does not impact an interface exposed by an object of the host application is released, a new version of the adapter need not be released. In this way, any version of custom code runtime or custom code with a proxy that adheres to the protocol will correctly interact with new versions of the host application that include a new version of the object because a new implementation of the adapter is also provided. Thus, the version resiliency between the host application, custom code runtime, and custom code is increased. In addition, when the protocol implemented by the adapter changes, a new custom code runtime or new custom code can be developed upon release of the new version of the host application without having to wait for a separate release of the adapter.

In an alternate embodiment, the version resiliency technique increases version resiliency between a host application and custom code when a custom code runtime is provided for the host application and the custom code runtime and the host application are on different release cycles. The custom code runtime provides an adapter for an object exposed by the host application that implements a protocol that is exposed to custom code. The custom code runtime executes in an application domain that is separate from the application domain of the host application and the application domain of the custom code. When a new version of the host application that impacts an interface exposed by an object of the host application is released, the version resiliency technique releases a new version of the adapter for the object that factors in the impact of the exposed object. The custom code, which provides a proxy for interacting with the adapter, can interact with the object of the new version of the host application via the new version of the adapter used by the existing version of the custom code runtime. Because the adapter and proxy execute in different application domains, this embodiment of the version resiliency technique will have the overhead of inter-application domain communications between the adapter and proxy. In addition, the protocol between the adapter and proxy will be limited to exposing the limited types of data specified in the inter-application domain communications mechanism. Nevertheless, this embodiment of the version resiliency technique will increase the version resiliency among the host application, the custom code runtime, and the custom code.

Figure 3:
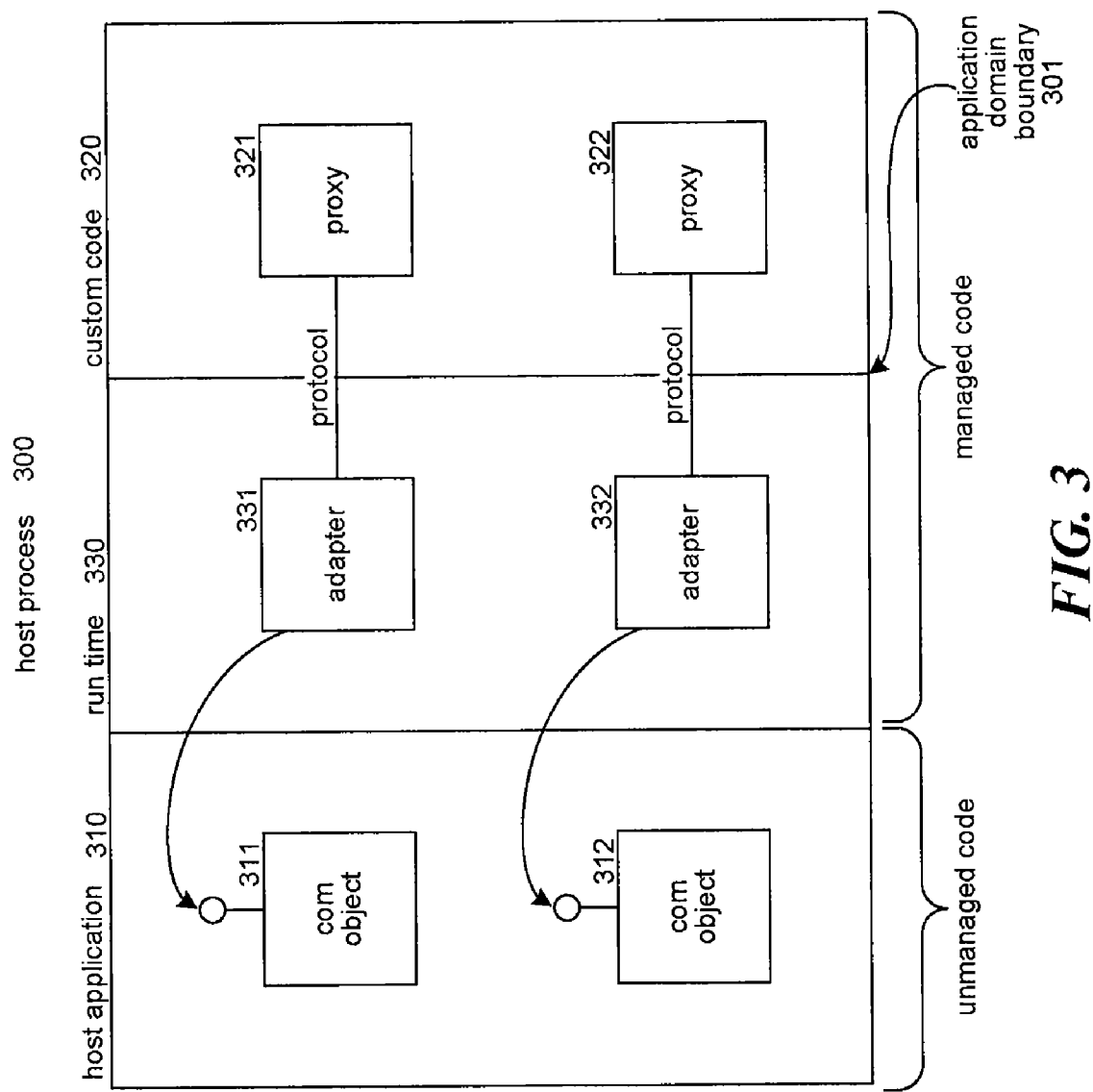
FIG. 3 illustrates an architecture that is an adaptation of MAF that provides version resiliency among a host application, a custom code runtime, and custom code.

FIG. 3 illustrates an architecture that is an adaptation of MAF that provides version resiliency among a host application, a custom code runtime, and custom code. A host process 300 includes a host application 310, custom code 320, and custom code runtime 330. The host application executes as unmanaged code, and both the custom code runtime and the custom code execute as managed code (e.g., in the .NET Framework) in separate application domains as indicated by application domain boundary 301, which is also a versioning boundary. The host application includes objects 311 and 312, the custom code runtime includes adapters 331 and 332, and the custom code includes proxies 321 and 322. Each adapter is an interface between the object and the custom code and implements an interface protocol that is immutable. As such, the developer of the host application is thus free to change the implementation of both an exposed object and its adapter so long as the protocol is not changed. In such a case, the custom code runtime and custom code is compatible with any version of the host application and its objects and the adapters. The .NET Framework provides for "unification" of different versions of assemblies. An assembly, which is a collection of components that version together, has its own version number along with the version numbers of the assemblies containing components with which it interacts. The adapters are included in assemblies provided by the host application, and the proxies are included in assemblies provided by the custom code. The .NET Framework can be configured to redirect references to the adapters and proxies to the versions of the proxies and adapters that are available to the .NET Framework. If the protocol between the adapters and proxies adheres to the restrictions on types of parameters that unification can support, the adapters and proxies can version separately and still run correctly regardless of the available versions. This architecture, however, has some of the limitations of MAF. In particular, since the adapters and proxies communicate over application domain boundaries, the types of data that can be passed are very restricted by the CLR. Also, the communication across application domain boundaries is more expensive than communication within an application domain, which slows the execution of the host application and the custom code.

Figure 4:
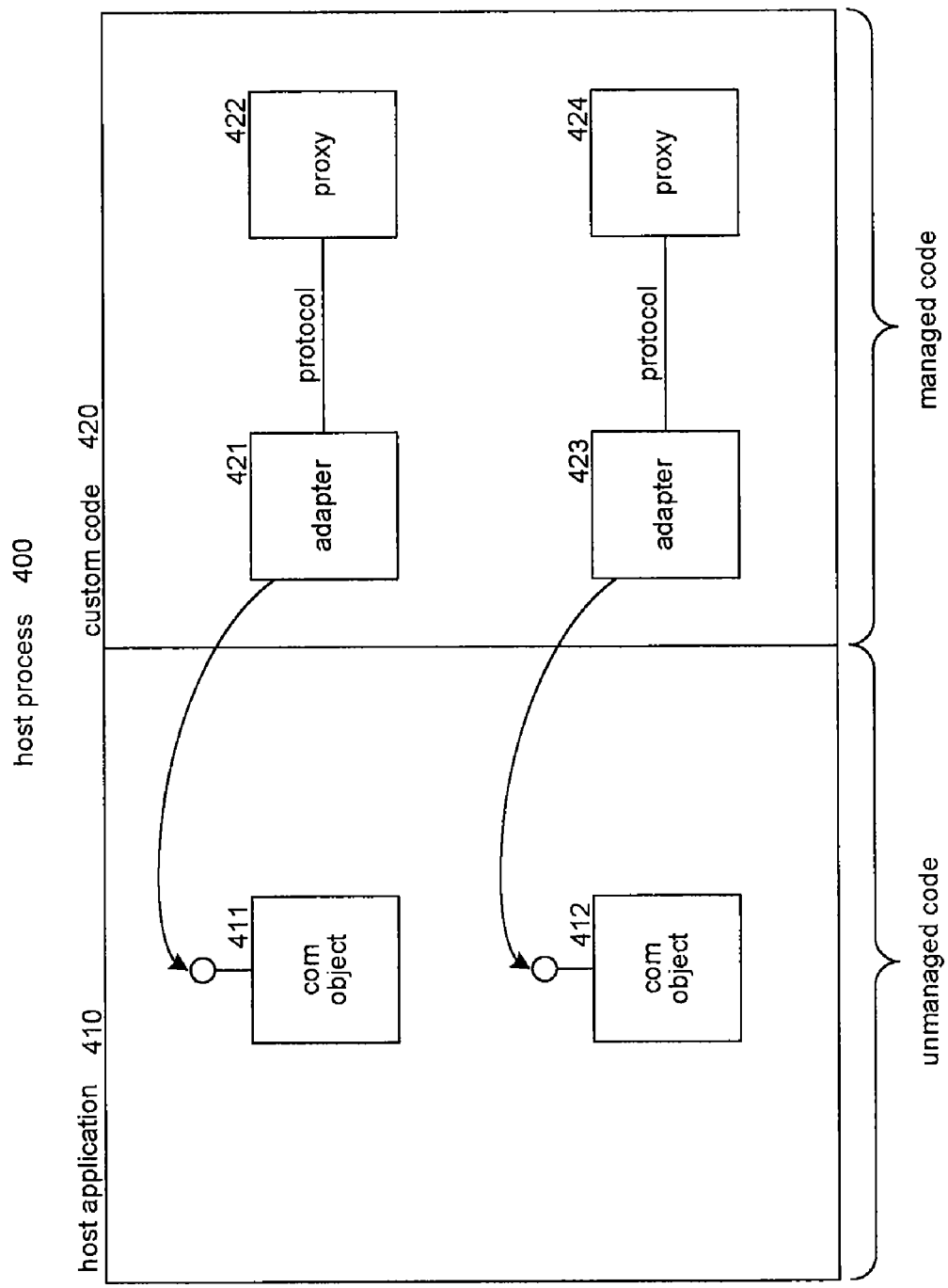
FIG. 4 illustrates an architecture that is an adaptation of MAF to an unmanaged host application environment that avoids the overhead of inter-application domain communications while maintaining version resiliency.

FIG. 4 illustrates an architecture that is an adaptation of MAF to an unmanaged host application environment that avoids the overhead of inter-application domain communications while maintaining version resiliency. A host process 400 includes a host application 410 and custom code 420. The host application executes as unmanaged code and the custom code executes as managed code. The host application includes objects 411 and 412, and the custom code includes adapters 421 and 423 and proxies 422 and 424. Each adapter is an interface between the object and the custom code and implements an interface protocol that is immutable. The adapters are updated with each version of the host application, and the proxies are updated with each version of the custom code. As described above, the unification provided by the .NET Framework allows the adapters and the proxies to version separately as indicated by versioning boundary 402 between the adapters and the proxies. Because the adapters and proxies are located in the same application domain, the communication between an adapter and its proxy does not have the overhead associated with inter-application domain communications. In addition, the protocol allows more types of data to be exposed than would be allowed if the communication between the adapter and the proxy was across an application domain. For example, the protocol may specify that a pointer to an object within the host application can be passed to the custom code. In such a case, the custom code directly accesses the object using the pointer (assuming that the object has a wrapper) allowing its methods to be invoked by custom code.

The computing devices on which the host application and custom code may be implemented may include a central processing unit, memory, input devices (e.g., keyboard and pointing devices), output devices (e.g., display devices), and storage devices (e.g., disk drives). The memory and storage devices are computer-readable media that may be embedded with computer-executable instructions that implement the host application and custom code. In addition, the instructions, data structures, and message structures may be stored or transmitted via a data transmission medium, such as a signal on a communications link.

The version resiliency technique may be used in conjunction with various computing systems or devices including personal computers, server computers, multiprocessor systems, microprocessor-based systems, network PCs, minicomputers, mainframe computers, distributed computing environments that include any of the above systems or devices, and the like. The host application and custom code may be used by various computing systems such as personal computers, cell phones, personal digital assistants, consumer electronics, home automation devices, and so on.

The host application and custom code may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The version resiliency technique may be used to increase version resiliency between host applications provided by Microsoft's Visual Studio Tools for Office and custom code developed for those host applications. Accordingly, the invention is not limited except as by the appended claims.

We claim:

1. A method for providing version resiliency between a host application that is unmanaged code and managed code, the host application and the managed code communicating via an adapter and a proxy that implement a protocol, by a method comprising:
   when a new version of the host application that impacts an interface exposed by an object of the host application is released, releasing a new version of the adapter for the object that factors in the impact of the exposed object, the adapter for executing in the same application domain as the managed code, wherein the adapter and proxy are instantiated within the application domain of the managed code; and
   when a new version of managed code that impacts an interface exposed by the proxy is released, releasing a new version of the proxy for the object that factors in the impact of the interaction.

2. The method of claim 1 wherein if a new version of the host application that does not impact an interface exposed by an object of the host application is released, a new version of the adapter need not be released.

3. The method of claim 1 wherein the adapter can expose types of data that are not constrained by restrictions on inter-application domain communications.

4. The method of claim 3 wherein the types of data that the adapter exposes include objects that adhere to the Component Object Model.

5. The method of claim 1 wherein the managed code executes in a .NET FRAMEWORK.

6. The method of claim 1 wherein the host application and the managed code are on different release cycles.

7. A method for providing version resiliency among a host application, a custom code runtime, and custom code, the host application being unmanaged code and the custom code being managed code, the host application and the custom code runtime communicating via an adapter that implements a protocol that is exposed to a proxy of the custom code, the host application, the custom code runtime, and the custom code executing in separate application domains, by a method comprising:
   when a new version of the host application that impacts an interface exposed by an object of the host application is released, releasing a new version of a custom code runtime that provides an adapter for the object that factors in the impact of the exposed object, the adapter for executing as managed code within an application domain of the custom code runtime that is separate from the application domain of the host application and the application domain of the custom code so that when a version of the host application is released that impacts the interface exposed by the object, custom code can be developed to interact with the impacted interface via the adapter of the custom code runtime.

8. The method of claim 7 wherein the object exposes an interface that adheres to the Component Object Model.

9. The method of claim 7 wherein the managed code executes in a .NET FRAMEWORK.

10. The method of claim 7 wherein the host application, the custom code runtime, and the custom code are on different release cycles.

11. A method for providing version resiliency among a host application, a custom code runtime, and custom code, the host application being unmanaged code and the custom code being managed code, the host application and the custom code runtime communicating via an adapter that implements a protocol that is exposed to a proxy of the custom code, the host application, the custom code runtime, and the custom code executing in separate application domains, by a method comprising:

when a new version of the host application that impacts an interface exposed by an object of the host application is released, releasing a new version of a custom code runtime that provides an adapter for the object that factors in the impact of the exposed object, the adapter for executing as managed code within an application domain of the custom code runtime that is separate from the application domain of the host application and the application domain of the custom code so that when a version of the host application is released that impacts the interface exposed by the object, custom code can be developed to interact with the impacted interface via the adapter of the custom code runtime; and when a new version of custom code that impacts an interface exposed by the proxy is released, releasing a new version of the proxy for the object that factors in the impact of the interaction.

12. The method of claim 11 wherein if a new version of the host application that does not impact an interface exposed by an object of the host application is released, a new version of the custom code runtime need not be released.

13. A computer-readable storage device storing computer-executable instructions for providing version resiliency between a host application that is unmanaged code and managed code, the host application and the managed code communicating via an adapter and a proxy that implement a protocol, by a method comprising:

when a new version of the host application that impacts an interface exposed by an object of the host application is released, releasing a new version of the adapter for the object that factors in the impact of the exposed object, the adapter for executing in the same application domain as the managed code, wherein the adapter and proxy are instantiated within the application domain of the managed code; and when a new version of managed code that impacts an interface exposed by the proxy is released, releasing a new version of the proxy for the object that factors in the impact of the interaction.

14. The computer-readable storage device of claim 13 wherein if a new version of the host application that does not impact an interface exposed by an object of the host application is released, a new version of the adapter need not be released.

15. The computer-readable storage device of claim 14 wherein the managed code executes in a .NET FRAMEWORK.

16. The computer-readable storage device of claim 14 wherein the host application and the managed code are on different release cycles.

17. The computer-readable storage device of claim 13 wherein the adapter can expose types of data that are not constrained by restrictions on inter-application domain communications.

18. The computer-readable storage device of claim 17 wherein the types of data that the adapter exposes include objects that adhere to the Component Object Model.

* * * * *